Patented Feb. 1, 1949

2,460,564

UNITED STATES PATENT OFFICE 2,460,564

CHLORINATION OF PHTHALIC ANHYDRIDE

Thad M. Amacker, Baton Rouge, La., assignor to The B. F. Goodrich Company, New York, N. Y., a corporation of New York No Drawing. Application September 11, 1946, Serial No. 696,376

3 Claims. (Cl. 260—341)

This invention relates to the chlorination of aromatic acid anhydrides and more specifically to the chlorination of molten phthalic anhydride.

The chlorination of phthalic anhydride in the molten state has been reported in patents and in the literature. Essentially the disclosed preparations consist of passing chlorine gas into molten phthalic anhydride containing a small amount of an iron salt of a non-oxidizing strong mineral acid as a chlorination catalyst, in a reaction vessel heated to maintain the anhydride in the molten state. The chlorination is carried out at atmospheric pressure, and, as a natural consequence, the phthalic anhydride vaporizes and must be condensed to prevent excessive losses of the anhydride. If the anhydride vapors would condense to form the liquid, the process would not present any operational problems, but phthalic anhydride vapors sublime readily and shortly coat the condenser cooling surfaces with a layer of the solid anhydride reducing the efficiency of the condenser. If the temperature of the cooling water to the condenser is decreased to compensate for the reduced heat transfer efficiency of the condensing surfaces, the cost of cooling of the condenser water becomes too great to make the process economically feasible. Even though sufficient cold water is supplied to the condenser without cooling the water by refrigeration, the build-up of the solid anhydride continues until the condenser is completely plugged giving rise to the danger of a rupturing of the reaction equipment by an internal pressure build-up.

Some of the existing processes involve the use of some very complicated mechanical devices to scrape the condenser cooling surfaces to remove most of the build-up of the solid anhydride, but, as might be expected, the scraping devices become fouled with the sublimed anhydride, and, since the scraping means do not clean the cooling surfaces completely, the efficiency of the condenser is still reduced. Also, if the condenser does not become obstructed by solid, the anhydride vapors escape thus defeating the entire purpose of the condenser.

I have discovered a method for chlorinating molten phthalic anhydride which not only is extremely efficient but also eliminates completely the solid build-up in the condenser. The method comprises passing chlorine through a heated mixture consisting of molten phthalic anhydride, an iron salt of a non-oxidizing strong mineral acid and an organic liquid which is a solvent for phthalic anhydride preferably at a temperature of about 180 to 250° C. The solvent vaporizes, the vapors are condensed in the reflux condenser, and the liquid solvent then dissolves the phthalic anhydride which has sublimed in the condenser and returns the dissolved anhydride to the reaction vessel. The build-up of any solid anhydride is thus prevented in a simple and efficient manner and the need for the previously employed inefficient and complicated mechanical scraping devices is eliminated. When the phthalic anhydride has been chlorinated to the desired product, the solvent can be driven off, condensed in the same condenser, and, by proper adjustment of flow-controlling means, can be collected and stored for future use.

The solvents that can be employed according to my invention are any of the organic compounds which possess boiling points in the range of about 60° C. to about 275° C., which are not oxidized in the presence of chlorine at such temperatures and which dissolve phthalic anhydride. Preferred solvent materials are hydrocarbons and chlorinated hydrocarbons which boil at about 60 to about 275° C., examples of which include aliphatic hydrocarbons containing from 6 to 15 carbon atoms such as n-hexane, isohexane, the various heptanes, octanes, nonanes, decanes, dodecanes, etc.; chlorinated aliphatic hydrocarbons such as tri-, tetra- and penta-chloroethanes, mono and dichlorobutanes, chlorinated heptanes, etc.; cycloaliphatic hydrocarbons and their chlorine derivatives such as cyclohexane and monochlorocyclohexane; aromatic hydrocarbons such as benzene, toluene, xylenes, ethyl benzene, etc., and chlorinated aromatic hydrocarbons such as chlorobenzene, dichlorobenzenes, chlorotoluenes, etc. Materials boiling at about 140 to 250° C. are especially preferred. Although materials which are liquid at room temperature are ordinarily used, organic compounds whose melting points are slightly above room temperature and whose boiling points are within the chlorination temperature range may also be employed. It is of no importance, as far as my invention is concerned, that the organic material employed to dissolve the solid phthalic anhydride in the condenser may become chlorinated during the process, although it may be of some importance in the economics of the process, and, if so, a solvent which will not chlorinate can be employed.

The following examples demonstrate the use of specific organic liquids according to my invention, it being understood that the reaction conditions and the quantities of materials used are not critical.

Example I

To a reaction vessel fitted with a reflux condenser and a tube for the delivery of chlorine there was added 444 parts by weight of phthalic anhydride. The reaction vessel was heated to about 130° C. and maintained at that temperature until the anhydride was completely melted at which time 20 parts by weight of finely-divided iron powder were added. The temperature of the molten phthalic anhydride was increased to about 240° C., and about 100 parts by weight of tetrachloroethane were added. Chlorine was added to the molten anhydride at the rate of about 140 parts by weight per hour for about four hours while maintaining a reaction temperature of substantially 240° C. During the chlorination process, 60 additional parts by weight of tetrachloroethane were added to increase the efficiency of the process. It was observed that during the process there was no solid anhydride building up on the condenser cooling surfaces. When the anhydride has been chlorinated to contain about one chlorine atom per molecule of anhydride, the addition of vaporous chlorine was stopped, the tetrachloroethane was driven off, and the chlorophthalic anhydride was separated from the ferric chloride. The yield of the chlorinated product was 543 parts by weight and contained substantially 19% chlorine, a yield of 99% based on the phthalic anhydride used.

Example II

To 444 parts by weight of molten phthalic anhydride at 185° C. there was added 11 parts by weight of finely-divided iron powder and 65 parts by weight of ortho dichlorobenzene. Then vaporous chlorine was added at the rate of 140 parts by weight per hour for about four hours while maintaining the reaction temperature at substantially 185° C. During the chlorination time the dichlorobenzene refluxed in the condenser and dissolved the sublimed anhydride leaving the condenser cooling surfaces free from sublimed anhydride. The solvent was then driven off and collected and the product recovered. The yield of chlorinated product was substantially quantitative.

The quantities of solvent materials employed in the above examples are not critical and may be varied to suit any particular reaction conditions. It will be readily understood that the optimum amount of solvent necessary for the preparation of chlorophthalic anhydride according to my invention varies according to the particular solvent used and according to the requirements of the process equipment. In general, sufficient solvent is employed to dissolve all of the phthalic anhydride.

My invention is not limited solely to the process of preparation of monochlorophthalic anhydride, for it is just as successful for the preparation of the tetrachlorophthalic anhydride compound and intermediately chlorinated phthalic anhydride products.

While I have herein described specific means for carrying out my invention, I do not desire nor intend to limit myself solely thereto, for as hitherto stated, the precise proportions of solvent material may be varied and other materials having the ability to readily dissolve the anhydride may be employed, if desired, without departing from the spirit and scope of the invention as defined in the appended claims.

I claim:

1. In the preparation of chlorinated phthalic anhydride by a process which includes the steps of introducing chlorine into molten phthalic anhydride containing iron powder as a source of ferric chloride catalyst, condensing any vapors of phthalic anhydride to prevent a loss of the anhydride, and finally separating the chlorinated product from the ferric chloride catalyst, the additional steps which comprise adding to the molten anhydride an organic solvent which has a boiling point in the range of 60° C. to 275° C. which does not oxidize in the presence of chlorine at 185° C. to 275° C. and which is a solvent for phthalic anhydride said solvent being selected from the class consisting of saturated aliphatic hydrocarbons having 6 to 15 carbon atoms, chlorinated saturated aliphatic hydrocarbons, cycloaliphatic hydrocarbons and their chlorinated derivatives, and aromatic hydrocarbons and their chlorinated derivatives, vaporizing the solvent, condensing the vapors of the solvent to liquid, and returning the liquid to the molten reaction mixture thereby to dissolve and return any sublimed phthalic anhydride, and finally evaporating the solvent from the chlorinated product.

2. In the preparation of chlorinated phthalic anhydride by a process which includes the steps of introducing chlorine into molten phthalic anhydride containing iron powder as a source of ferric chloride catalyst, condensing any vapors of phthalic anhydride to prevent a loss of the anhydride, and finally separating the chlorinated product from the ferric chloride catalyst, the additional steps which comprise adding to the molten anhydride the solvent tetrachloroethane, vaporizing this solvent, condensing the vapors of the solvent to liquid, and returning the liquid to the molten reaction mixture thereby to dissolve and return any sublimed phthalic anhydride, and finally evaporating the tetrachloroethane from the chlorinated product.

3. In the preparation of chlorinated phthalic anhydride by a process which includes the steps of introducing chlorine into molten phthalic anhydride containing iron powder as a source of ferric chloride catalyst, condensing any vapors of phthalic anhydride to prevent a loss of the anhydride, and finally separating the chlorinated product from the ferric chloride catalyst, the additional steps which comprise adding to the molten anhydride the solvent orthodichlorobenzene, vaporizing this solvent, condensing the vapors of the solvent to liquid, and returning the liquid to the molten reaction mixture thereby to dissolve and return any sublimed phthalic anhydride, and finally evaporating the orthodichlorobenzene from the chlorinated product.

THAD M. AMACKER.

REFERENCES CITED

The following references are of record in the file of this patent:

UNITED STATES PATENTS

| Number | Name | Date |
| --- | --- | --- |
| 1,231,123 | Brooks | June 26, 1917 |
| 1,784,267 | Britton et al. | Dec. 9, 1930 |
| 2,028,383 | Dvornikoff | Jan. 21, 1936 |
| 2,092,795 | Beckett et al. | Sept. 14, 1937 |
| 2,426,080 | Chapman et al. | Aug. 19, 1947 |
| 2,429,985 | Blume et al. | Nov. 4, 1947 |